Oct. 6, 1970 E. O. OLSEN 3,533,090

MAGNETIC ANALOG MEMORY

Filed Dec. 28, 1967 4 Sheets-Sheet 1

INVENTOR.
EVERETT O. OLSEN
BY David E. Hoppe
ATTORNEY

INVENTOR.
EVERETT O. OLSEN
BY David E. Hoppe
ATTORNEY

INVENTOR.
EVERETT O. OLSEN
BY David E. Hoppe
ATTORNEY

INVENTOR.
EVERETT O. OLSEN
BY David E. Hoppe
ATTORNEY

United States Patent Office 3,533,090

Patented Oct. 6, 1970

3,533,090

MAGNETIC ANALOG MEMORY

Everett O. Olsen, Wrentham, Mass., assignor to The Foxboro Company, Foxboro, Mass., a corporation of Massachusetts Filed Dec. 28, 1967, Ser. No. 694,135

Int. Cl. G11c *11/48, 27/00;* H01f *35/00*

U.S. Cl. 340—174 7 Claims

ABSTRACT OF THE DISCLOSURE

A non-linear magnetic core has its permeability of its magnetic material altered by an input signal, which permeability setting thereby represents a stored analog value; the core is combined with an input signal circuit, a read-out circuit, and a linearizing feedback circuit; cyclical operation increments the stored signal to the level of the long-term output signal, thereby eliminating storage fall back.

Magnetic cores have long been contemplated as a useful means for providing an analog memory, as contrasted with their practical employment for binary memory devices. Attempts to utilize magnetic cores for analog storage have revealed a number of difficulties. One problem area has been in relating the output values to the analog magnitude of the input signals; the relationship is generally non-linear, and in addition typically involves fall-back, or the difference between the magnitude of a signal as it is read into a core, and the subsequent long-term readout of the stored value. Also, problems relating to stable reset reference, repeatability, resolution, long-term storage, temperature effects, and stability have been involved with various attempts to utilize the magnetic core for analog storage.

If the magnetic core could be utilized for an analog memory, its would offer advantages in various applications including process control characterized by the long-term storage achievable, theoretically infinite, and the non-destructive readout inherent in such a device. To be considered is the independence of magnetic storage from a continuous power supply, which permits immediate resumption of the application function after a power failure, for example, an advantage not readily available with electronic types of memories.

Accordingly, the present invention incorporates the magnetic core in circuit configurations adapted to provide a linear magnetic analog memory having good characteristics of stability, repeatability, and resolution. In general, the invention provides for a storage medium which provides at any desired time an accurate replication of the original stored signal, such storage being unalterable except by appropriate write signals.

Briefly stated, the present invention provides for a linearized analog memory function by means of circuit feedback adapted to equate the long-term stored signal to the input signal magnitude; the long-term output signal is fed back and differenced with the input signal, the resultant deviation being cyclically applied to the magnetic core to increment its storage to the required flux level for equating the stored signal with the input signal; when the deviation is minimized the long-term output signal is substantially equal to the input signal; such equation thereby places the remanence flux level at the proper value for obtaining at any time an output signal accurately representative of the original input signal.

These and other advantages of the invention will be in part apparent from the specification below and in part from the figures in which.

Figure 1:
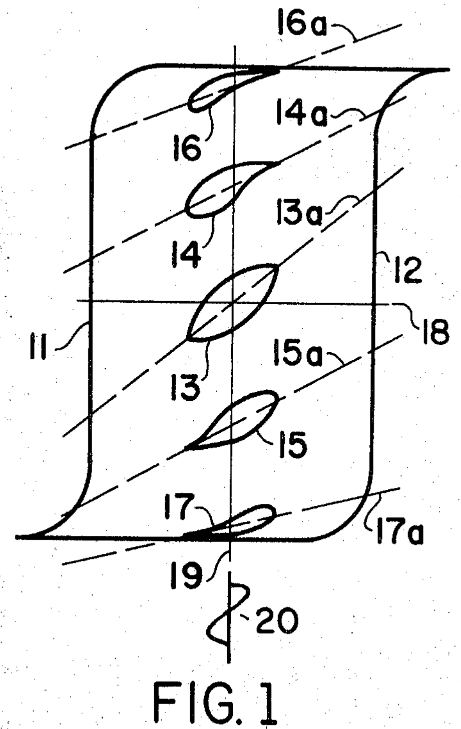
FIG. 1 is a typical B–H family of hysteresis loops for a non-linear magnetic core utilized as an analog storage medium.

Referring to FIG. 1, a magnetic core utilizable with the present invention typically exhibits a major hysteresis curve 11, 12 which is obtained when the core is excited by a magnetizing signal having an amplitude sufficient to drive it into its alternate saturated conditions on each half-cycle. By utilizing magnetizing signals less than those producing saturation, various flux levels may be set in the magnetic core, each flux level corresponding to a particular permeability condition of the non-linear magnetic core. The non-linear magnetic core will exhibit maximum permeability when demagnetized. Should the completely demagnetized core be excited by a relatively low-amplitude alternating current signal symbolized by exciting signal 20, the magnetic core will exhibit a minor hysteresis loop 13 symmetrical about the de-magnetized flux level 18. That is, as exciting signal 20 alternates to either side of the zero magnetizing energy condition 19, it causes the magnetic core to exhibit corresponding changes in flux level, as illustrated in the plot of loop 13; loop 13 exhibits hysteresis in a slightly different relationship between exciting signal and flux level as between positive-going and negative-going portions of signal 20. Should the magnetic core by partially magnetized, illustratively, at a flux level corresponding to the intersection of slope line 14A with line 19, the core will exhibit minor hysteresis loop 14, which plots the relationship of flux to the exciting signal 20. Note that at this magnetized condition of the core, the minor hysteresis loop 14 is not symmetrical, exhibiting a somewhat tear shape. Should the core be saturated in the direction initiated by the signal producing loop condition 14, the core will then exhibit minor hysteresis loop 16 when excited by signal 20. Loop 16 may be seen to be quite asymmetrical. As the core is increasingly magnetized from its completely demagnetized condition, the minor hysteresis loops thereby obtained decrease in their slopes, as exemplified by decreasing slope lines 13*a*, 14*a*, and 16*a*; the slope decrease indicates that the permeability decreases, inasmuch as a smaller change in flux level is achieved by the exciting signal 20 at saturation than is achieved by the same amplitude of signal 20 at the demagnetized condition of the core.

If the direction of the magnetized current is reversed the core may exhibit loops such as 15 and 17, in the reversed flux region of major loop 11, 12.

An essential feature of the analog memory function is for the core to retain whatever magnetized condition it has been last placed in; that is, the core magnetization producing minor hysteresis loop 14, for example, must remain stable so that at any future time the application of exciting signal 20 will always produce the same magnetic behavior of the core. Conveniently, read-out may be obtained at any desired time by the application of an alternating current signal of predetermined limited magnitude, such as signal 20. Such excitation signal will then always produce an output related to the magnetized condition of the core. The excitation signal must be small enough not to affect the long-term magnetization of the core, and must also be large enough to produce a consequent output signal dependent upon core permeability.

In general, cores are utilizable for the practice of the invention if their permeability changes with the degree of magnetization; that is, if the slopes of the minor hysteresis loops should vary with the remanence flux level. For good operation, it is essential that the core utilized have a sufficiently low temperature coefficient to meet the specifications of the intended applications. Along the same line, materials which exhibit an appreciable non-reversible memory characteristic when temperature cycled are not as suitable.

Figure 2:
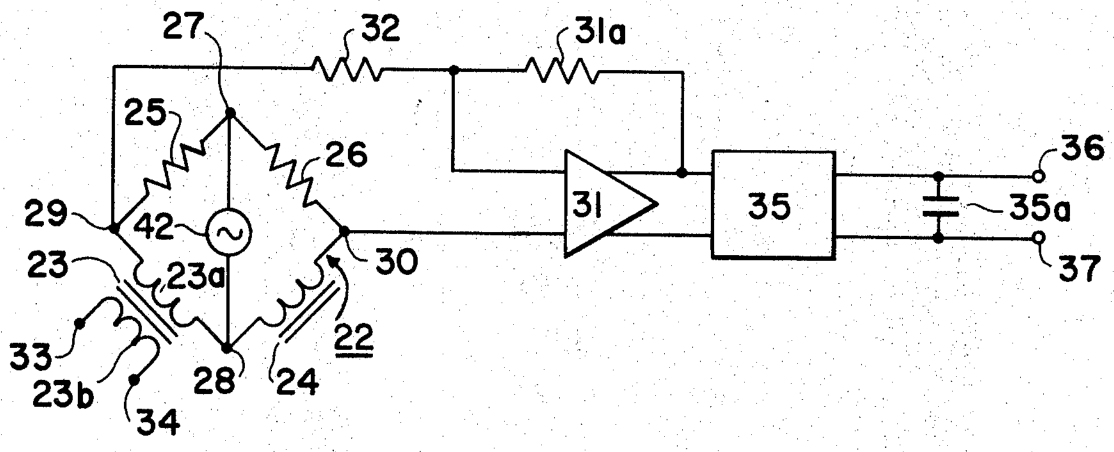
FIG. 2 is a schematic diagram of a circuit employing a magnetic core as a storage element in a bridge.

Convenient methods for applying input signals and resetting the analog memory are disclosed in copending application Serial 694,136 filed Dec. 28, 1967 of Harada filed concurrently with this. Read-out may be obtained by the method disclosed in the Harada application, namely the use of the core as a variable coupling transformer, the permeability determining the magnitude of the output signal. Alternatively, read-out may be obtained by employing the core as one arm of a bridge as shown in FIG. 2. The bridge, generally indicated at 22, is made up of winding 23*a* of core 23, linear inductance 24, and resistors 25 and 26. Source 42 of an alternating current excitation signal is applied across bridge 22 to points 27 and 28 thereof. If bridge 22 balances, the output taken across the bridge at points 29 and 30 will be nulled, which output is applied therefrom through resistance 32 serially with point 29. Resistance 32, in conjunction with resistance 31A connected between the output and input of amplifier 31, operates to stabilize the gain of amplifier 31 at some constant level.

The degree of magnetization of core 23 and hence its permeability may be altered by an input signal at terminals 33 and 34, which terminals are connected to winding 23*b* on core 23. The magnetizing current through coil 23*b* is proportional to the input signal and hence the degree of magnetization will be determined by the magnitude of the input signal. The A.C. output of amplifier 31 may be conveniently converted to D.C. by rectifier 35 and filter capacitor 35A to provide a D.C. output signal representative of the remanence condition of core 23. The D.C. output signal will be continuously provided so long as excitation is applied to bridge terminals 27 and 28. Alternatively, the excitation may be applied only at times read-out is desired, consequently providing a D.C. signal to output terminals 36 and 37 at those times.

Figure 3:
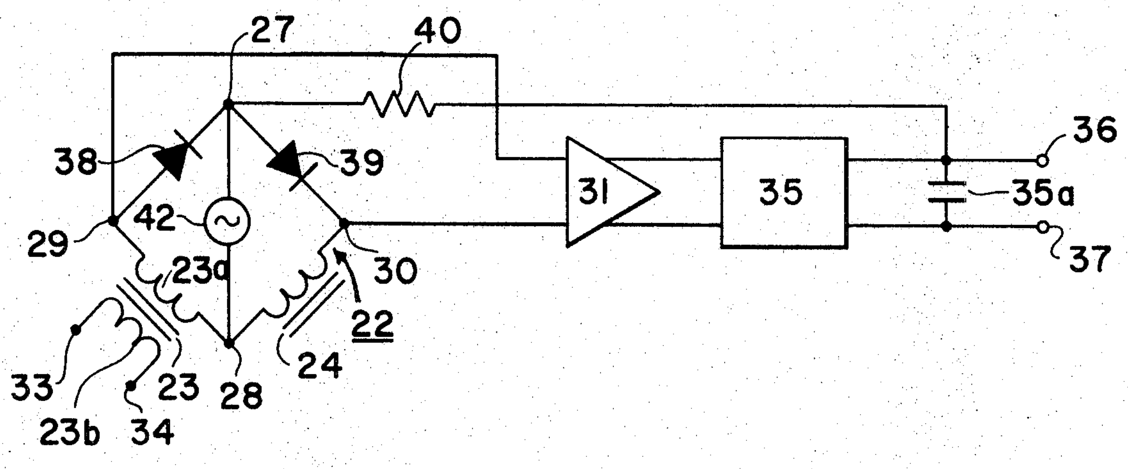
FIG. 3 is a schematic diagram of a circuit employing a magnetic core as a storage element in a bridge balanced by variable-capacity diodes.

Referring to FIG. 3, an alternative embodiment of the circuit of FIG. 2 involves the use of variable capacity diodes 38 and 39 in bridge 22 in place of resistors 25 and 26. Feed-back connected between output terminal 36 and bidge terminal 27 through resistor 40 to point 27 of bridge 22 operates to impress a potential upon diodes 38 and 39 to change their capacities so as to tend to rebalance bridge 22 whenever core 23 assumes a different value as a consequence of a magnetizing or demagnetizing signal on winding 23*b*. Diodes 38 and 39 are connected cathode and anode respectively to bridge terminal 27, so as to increase the capacity of one, while decreasing the capacity of the other in response to the feedback rebalancing signal. In this manner, bridge 22 tends to be rebalanced as core 23 has different analog values stored therein, and the bridge output, from terminals 29 and 30 thereof, is such as is necessary, when amplified by amplifier 31, to provide the proper rebalancing signal. The D.C. output at terminals 36 and 37 is proportional to the required rebalancing signal, and thus corresponds to the imbalance caused by the degree of storage in core 23.

Figure 4:
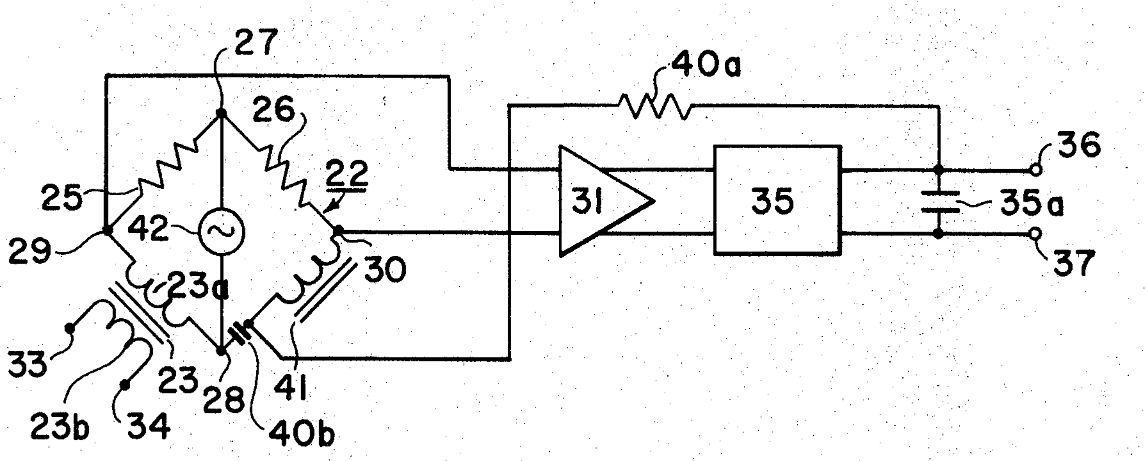
FIG. 4 is a schematic diagram of a circuit employing a magnetic core as a storage element in a bridge balanced by a non-linear inductance.

As yet another alternative embodiment, the circuit employed in FIG. 4 retains resistances 25 and 26 in bridge 22, and substitutes a non-linear inductance 41 for the linear inductance 24 illustrated in FIG. 2. Non-linear inductance has no appreciable hysteresis and exhibits no storage function. Feedback is taken from output terminal 36 and supplied through resistance 40*a* to the junction of capacitor 40*b* and inductance 41, capacitor 40*b* providing D.C. isolation for bridge 22 from the feedback signal. Again, the feedback is connected so that any tendency to bridge imbalance as a consequence of change in flux storage of core 23 is compensated by a change in the level of feedback current through inductance 41 thereby changing the value of its inductance so that the bridge tends to be rebalanced. In this manner, the required rebalancing current is proportional to the output from bridge 22 at terminals 29 and 30 thereof; the bridge output is amplified by amplifier 31 and supplied to output terminals 36 and 37 as the stored analog output signal.

Figure 5:
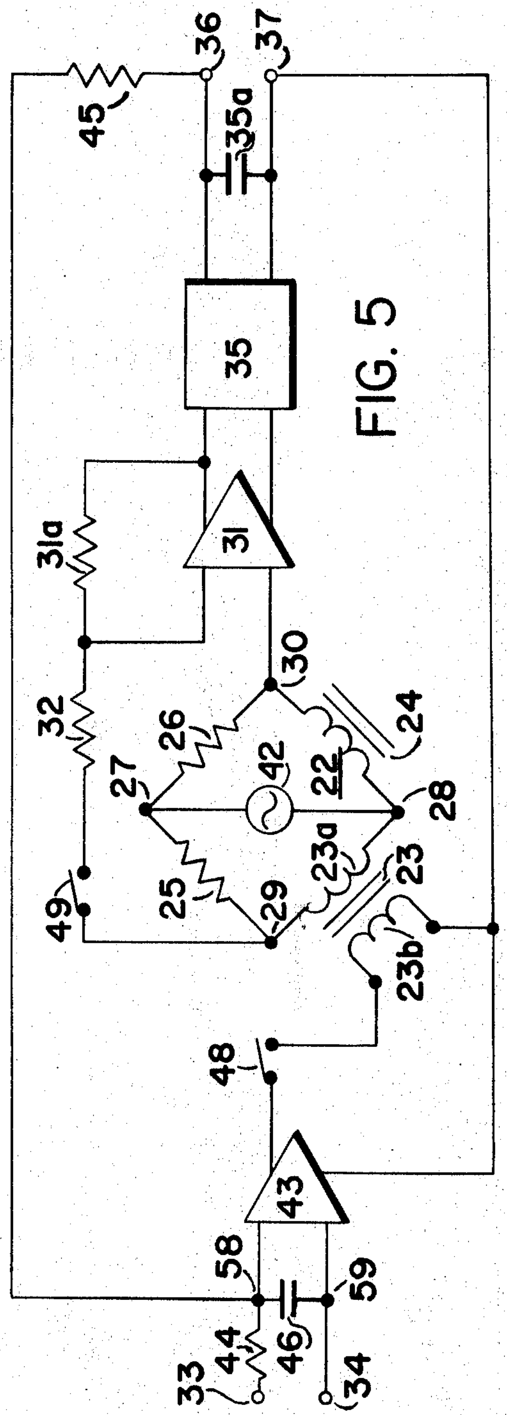
FIG. 5 is a schematic diagram of a bridge storage circuit employing linearizing feedback.

In order to provide improved linearity the circuit embodiment illustrated in FIG. 5 employs the bridge circuit of FIG. 2 with a feedback circuit from output terminal 36 through resistance divider 45, to input terminal 58 of amplifier 43. The input signal is coupled from terminal 33 through resistance divider 44 to input terminal 58 while terminal 34 is directly connected to input terminal 59 of amplifier 43. In the case where resistance 44 is equal to resistance 45, the difference between the output signal at terminals 36 and 37 and the input signal at terminals 33 and 34 appears at point 58 to be applied to amplifier 43. In the case where the output signal is equal to the input signal, the input to amplifier 43 is nulled and no output from amplifier 43 is obtained. Should the output signal differ from the input signal by either being greater or smaller, a differential signal appears at point 58 and a corresponding output from amplifier 43 is coupled through switch 48 to magnetizing coil 23B of core 23. The polarity of magnetizing current through winding 23B is such that output 36, 37 is made more closely to equal input 33, 34.

Capacitor 46 is connected across input terminals 58, 59 of amplifier 43 to thereby form, in conjunction with resistance 44, a lag circuit. This prevents a new level of input signal from being compared with a greatly divergent output signal level to thereby drive core 23 to saturation. The lagging function provided for smaller increments of core 23 readjustment; a sequence of readjustments then will establish the correct flux level for core 23.

If the input signal is momentary, the feedback loop should only be actuated during the presence of the input signal. That is, switch 48 should be closed only during the presence of an input signal. When the input signal disappears, switch 48 must be opened, or else the difference between the output signal and the zero effective input signal will tend to cause the output to thereupon be placed at zero by the feedback action.

Should the circuit of FIG. 5 store, by means of a single magnetizing pulse of current, the analog value of a new input signal, and thereupon switch 48 be opened, the output signal at 36, 37 generally changes somewhat. This occurs as a consequence of the core 23 generally exhibiting a somewhat different permeability between the cases of magnetizing current being present and absent.

This difference in permeability between the condition of core 23 while having magnetizing current applied and the condition of core 23 after the magnetizing current is removed may be termed "fallback." The difference in permeability is responsible for the difference in the bridge 22 output between energized and de-energized conditions of the magnetizing current through winding 23B of core 23. The fallback of the output signal with the magnetizing current removed may be in the order of several percent. In addition, the actual percentage varies with the level of remanence in core 23. To reduce the error inherent in the above-described behavior of core 23, switch 48 is cycled several times during the presence of an input pulse signal, preferably with a short closed portion of its duty-cycle. The cycling of switch 48 operates the feedback loop several times during the presence of single input pulse at input terminal 33, 34. The difference between the output signal and the input signal is applied via switch 48 to magnetizing winding 23B to correct any error; when switch 48 is opened, the output continues to appear at terminals 36, 37 unchanged by the feedback network and input circuit. Each time switch 48 is closed, any existing error between the output signal and the input signal is again sensed and applied through switch 48 to magnetizing winding 23B in a manner to further reduce the error. After a few cylces of incremental error corrections as above descibed, the error between the input signal and the output signal will reduce to a negligible or unascertainable value. When the input pulse at terminals 33 and 34 terminates, switch 48 thereupon is opened until the appearance of the next input pulse signal. Capacitor 35A at the output of filter rectifier 35 operates to present substantially at terminals 36 and 37 an output signal during the rest interval of circuit operation, so that the output signal used as a reference for error correction is that output signal which is also present while the feedback circuit is rendered inoperative by the opening of switch 48.

As a further refinement in eliminating errors due to fallback or effects of the magnetizing pulse in the correction cycle, switch 49 may be inserted between bridge terminal 29 and the input of amplifier 31 and so operated to disconnect amplifier 31 from the bridge during the short sampling interval of the duty-cycle while core 23 is either incrementally magnetized or incrementally demagnetized by appropriate current supplied to magnetizing winding 23*b*. That is, the output signal at terminals 36, 37, as established by the capacitive charge on capacitor 35*a*, can not in any way be affected by the transients associated with the error correction within bridge 22, while switch 49 is open. Logic which insures said switch 49 is open while switch 48 is closed or actively closing or opening, may readily be incorporated in the circuit, with switch 49 thereafter being closed during the rest interval of the storage circuit, that is, while switch 48 is open.

Figure 6:
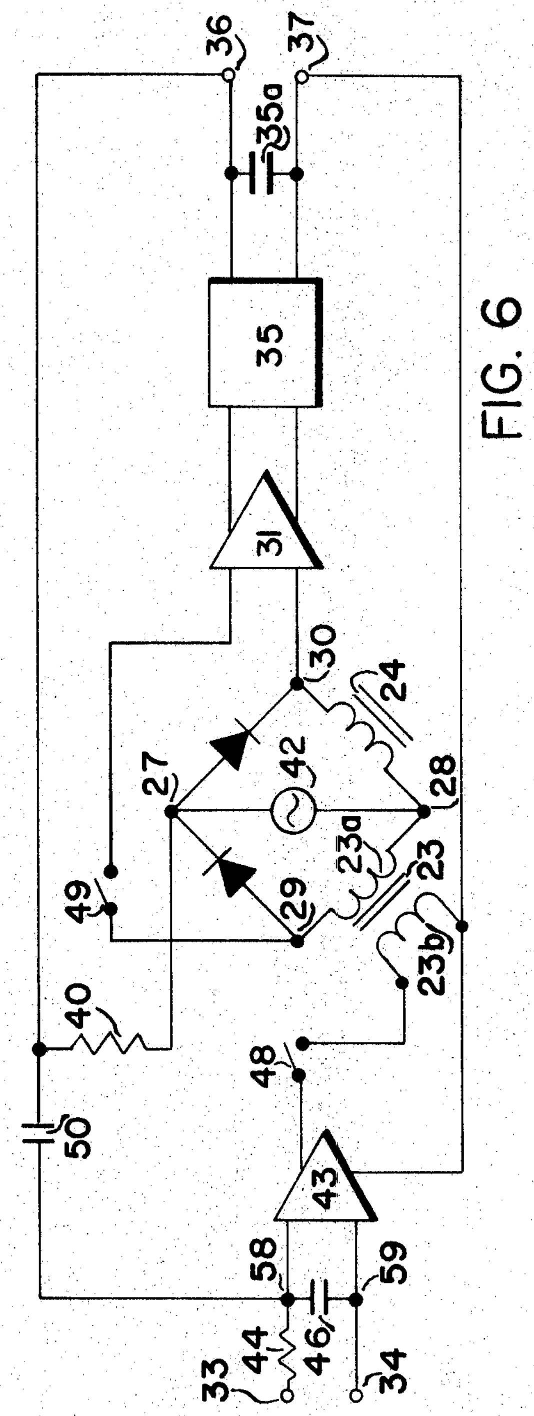
FIG. 6 is a schematic diagram of a bridge storage circuit employing capacitive feedback for performing a memory incrementing function.

As an alternative to storing the magnitude of an input signal, it may be desirable to increment the stored value to a new level, according to the absolute value of an input signal. That is, the analog memory may be altered to a new stored value by a specified amount, which amount is supplied by the input signal. Referring to the embodiment of FIG. 6, a capacitor 50 supplies feedback from output terminal 36 to input terminal 58 of amplifier 43. This embodiment substitutes capacitor 50 for feedback resistance 45 illustrated in the embodiment of FIG. 5, and incorporates as an alternative example, the variable capacity bridge circuit illustrated in FIG. 3. It is to be understood that any form of bridge circuit may be employed with the capacitive feedback embodiment, the circuit of FIG. 6 being employed illustratively. The overall operation of the circuit of FIG. 6 is analagous to that of an intergating amplifier, in which the output signal is changed an incremental amount, according to the magnitude of the input signal supplied to terminals 33 and 34. In effect, the output signal, and the memorized signal is an integration of the input signal. Note, feedback resistance 40 controls the bridge balance, being connected to output terminal 36.

The stored systems described above, whether employing resistors feedback to facilitate storage of a value proportional to the amplitude of an input signal, or capacitor feedback for incremental storage, may also be employed with an input signal in a time duration form, which form is integrated to a magnitude which is then applied to the storage circuits for further processing.

The circuits described above each have as an objective the analog storage of a value corresponding to the magnitude of an input signal, which magnitude is proportional to its amplitude. A convenient waveform for the input signal is a pulse of the desired polarity having a variable height proportional to the magnitude of the input signal. It is convenient to have the pulse duration of such an input signal standardized at some desirable interval. Employing the circuit of FIG. 6, it is, of course, possible to store the analog value of an input signal having a constant height but a variable duration, the magnitude of the input signal corresponding to the duration of the pulse. To use a variable duration input signal with the circuit of FIG. 5 it is required that the input signal must first be integrated to produce a signal corresponding to the area under the pulse. Any form of integrating circuit may be employed for this function. The integrated signal, which has an amplitude proportional to the pulse area, is then applied to the input terminals 33, 34 of the embodiments described.

Figure 7:
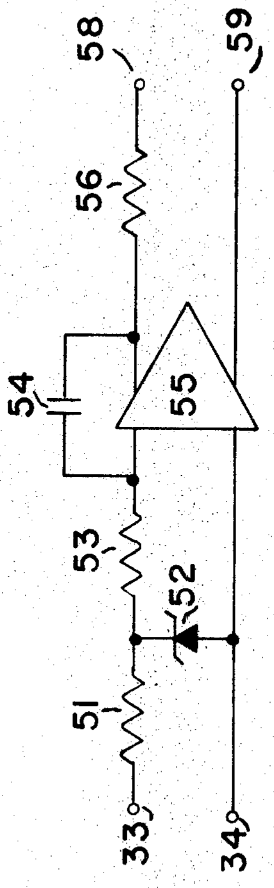
FIG. 7 is a schematic diagram of an input circuit for integrating the value of a variable time duration input pulse signal.

The circuit of FIG. 7 may be employed to perform the integrating function for an input signal. The input signal at terminals 33, 34 is applied through a network consisting of resistors 51 and 53 and Zener diode 52 to the input integrating amplifier 55, which is output-input coupled by capacitor 54. The output of amplifier 55 is an integration of the input signal time duration at terminals 33, 34. This output is coupled through resistor 56 to input terminals 58, 59 of amplifier 43, illustrated in FIGS. 5 and 6.

Zener diode 52 in conjunction with input resistor 51 functions to limit the input pulse level to a stable value, so that the circuit following which includes miller amplifier 55, may operate to produce an output signal which is an integration of the input pulse duration; thereby the output signal corresponds to the area under the pulse.

Figure 8:
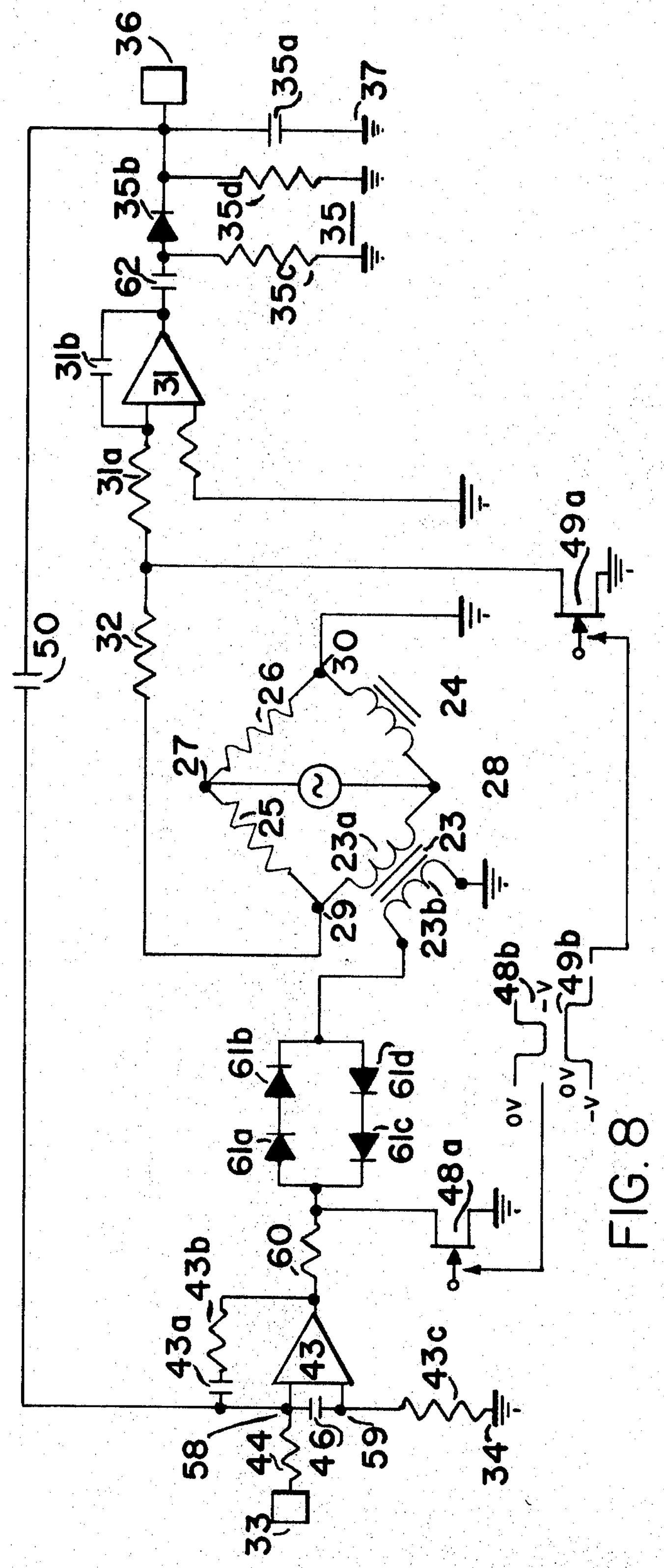
FIG. 8 is a schematic diagram of another embodiment of the invention.

Referring to FIG. 8, a working embodiment of the invention is illustrated schematically, having components corresponding to those of previous figures with like reference numerals. The switching circuits employ FET transistor gates, the switching set-up being effectively a parallel arrangement as contrasted with the serial arrangement illustrated in FIGS. 5 and 6. Switch 48*a* is normally a low resistance with zero voltage applied to its gate. It thus grounds the junction of resistor 60 and limiting diode series 61. This prevents any output of amplifier 43 from being applied to magnetizing coil 23*b*. Upon the application of negative voltage pulse 48*b*, switch 48*a* becomes a high resistance allowing the amplifier 43 output to be applied thru diode series 61 to magnetizing coil 23*b*. Resistor 60 prevents the enabling switch 48*a* from loading down the output of amplifier 43, and affecting the amplifier performance. Diodes 61*a* through 61*d* present a high impedance to A.C. voltage on magnetizing winding 23*b* when no input signal is present; they breakdown at a low amplitude to allow the application of any input signal to magnetizing winding 23*b*. This serves the function of effectively disconnecting winding 23*b* during times no input signal is being applied thereto. As an alternative design choice, the input signal may be applied directly from the output of amplifier 43 to magnetizing winding 23*b*, with the FET switch inserted serially between its other end and ground.

FET switch 49*a* normally has a negative voltage applied to its gate causing it to have high resistance between source and drain. When pulse 49*b*, having a peak of zero volts, occurs FET switch 49*a* reduces its source-drawn resistance and effectively grounds the junction of resistors 32 and 31*a*. This effectively disconnects the output of bridge 22 from the input of output amplifier 31. Thus it may be seen, that the output signal appearing at 36, 37 can in no way be affected by switching transients in bridge 22 while switch 48*a* is being actuated. Alternately a series switching approach may be used.

Resistor 43*c* between terminal 59 and ground is employed to balance the inputs of differential amplifier 43. A network consisting of capacitor 43*a* and resistor 43*b* connected between the input and output of amplifier 43 perform a filtering function. Capacitor 62 in the output of amplifier 31 is a coupling capacitor to block D.C. of the amplifier 31 output from the rectifier 35*b* and filter 35*a*.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An analog memory circuit comprising, a non-linear magnetic core exhibiting permeability variable with remanence flux level, a bridge circuit employing a winding of said core therein, a source of alternating current exciting said bridge circuit, an output from said bridge circuit representative of the stored value in said non-linear magnetic core, means responsive to said output from said bridge circuit to convert said output to a direct current signal representative of said stored value in said non-linear magnetic core, comparison means having a first input responsive to said input signal and a second input responsive to feedback from said direct current signal and having an output for changing the magnetization of said core, a magnetizing winding on said core responsive to said output from said comparison means, whereby the operation of said comparison means tends to linearize the storage of said input signal.

2. The analog memory circuit of claim 1 with means for enabling the operability of said magnetizing winding of said magnetic core during the application of an input signal.

3. The analog memory circuit of claim 1 with means for periodically duty-cycling the operability of said magnetizing winding during the application of an input signal so that the difference between said input signal and said output signal is periodically applied to remagnetize said magnetic core in a manner to reduce the deviation between the values of said input signal and said output signal.

4. The analog memory circuit of claim 1 employing capacitive feedback from said direct current signal to said second input of said comparison means for performing the function of storing the integrated value of an input signal applied to said first input of said comparison means.

5. The analog memory circuit of claim 1 with an integrating circuit for converting a variable pulse duration input signal to a corresponding amplitude variable signal for application to said first input of said comparison means.

6. The analog memory circuit of claim 1 with a lag circuit at said first input of said comparison means.

7. The analog memory circuit of claim 1 with a lag circuit at said first input of said comparison means and with means for periodically duty-cycling the operability so that the difference between said input and said output signal is periodically applied to remagnetize said magnetic core in a manner to reduce the deviation between the values of said input signal and said output signal.

References Cited

UNITED STATES PATENTS 3,106,704 10/1963 Eby ---------------- 340—174

OTHER REFERENCES

Publication I—Ferromagnetism by Richard M. Bozorth, D. Van Nostrand Company, Inc., Princeton, N.J., March 1951 (reprinted February 1961), pp. 852–853.

JAMES W. MOFFITT, Primary Examiner

U.S. Cl. X.R.

307—88